United States Patent
George

(10) Patent No.: US 7,870,311 B2
(45) Date of Patent: Jan. 11, 2011

(54) PREEMPTIVE PACKET FLOW CONTROLLER

(75) Inventor: H. Allan George, Norton, MA (US)

(73) Assignee: Wind River Systems, Inc., Alameda, CA (US)

( * ) Notice: Subject to any disclaimer, the term of this patent is extended or adjusted under 35 U.S.C. 154(b) by 805 days.

(21) Appl. No.: 11/066,663

(22) Filed: Feb. 24, 2005

(65) Prior Publication Data

US 2006/0193260 A1     Aug. 31, 2006

(51) Int. Cl.
G06F 3/00 (2006.01)
G06F 13/00 (2006.01)
H04L 12/28 (2006.01)
H04J 3/16 (2006.01)
H04J 3/24 (2006.01)

(52) U.S. Cl. ............... 710/33; 710/1; 710/6; 710/20; 710/35; 710/40; 710/59; 370/389; 370/392; 370/396; 370/410; 370/412; 370/414; 370/465; 370/473

(58) Field of Classification Search ............... None
See application file for complete search history.

(56) References Cited

U.S. PATENT DOCUMENTS

| | | | | |
|---|---|---|---|---|
| 4,939,718 | A * | 7/1990 | Servel et al. | 370/410 |
| 5,539,729 | A * | 7/1996 | Bodnar | 370/232 |
| 5,604,742 | A * | 2/1997 | Colmant et al. | 370/396 |
| 5,978,858 | A * | 11/1999 | Bonola et al. | 710/1 |
| 6,567,839 | B1 | 5/2003 | Borkenhagen et al. | 718/103 |
| 6,643,612 | B1 * | 11/2003 | Lahat et al. | 702/186 |
| 6,691,268 | B1 * | 2/2004 | Chin | 714/726 |
| 6,707,825 | B1 * | 3/2004 | Turner et al. | 370/467 |
| 6,714,553 | B1 * | 3/2004 | Poole et al. | 370/412 |
| 6,721,277 | B1 * | 4/2004 | Yu et al. | 370/251 |
| 6,747,654 | B1 * | 6/2004 | Laksono et al. | 345/502 |
| 6,975,629 | B2 * | 12/2005 | Welin | 370/392 |
| 7,085,849 | B1 * | 8/2006 | Clark et al. | 709/234 |
| 7,100,020 | B1 * | 8/2006 | Brightman et al. | 712/18 |
| 7,526,085 | B1 * | 4/2009 | Bong | 380/37 |

(Continued)

OTHER PUBLICATIONS

Wang Zhen-xing et al. "Chain-packet Switching." Proceedings of the 18th International Conference on Advanced Information Networking and Application (IEEE Computer Society, 2004).*

Primary Examiner—Tariq R. Hafiz
Assistant Examiner—Henry Yu
(74) Attorney, Agent, or Firm—Fay Kaplun & Marcin, LLP

(57) ABSTRACT

Described is a system to control a flow of packets to and from an electronic processor which includes a packet processor engine programmed to interpret the packets from a packet memory, and to perform switching between packet chains in response to events, a working chain pointer register of the packet processor engine, programmed to indicate progress in executing an active buffer chain, prioritized pointer storage registers of the packet processor engine, each of the registers being programmed to point to one of the active buffer chains, a control register of the packet processor engine having chain start bits and chain protect bits, the chain start bits identifying the chains that have been started and wsa status register of the packet processor engine, having a chain actives group identifying the chain that is currently running, a chain matches group, a chain stops group identifying the chains that have been stopped and a timer expirations group.

25 Claims, 7 Drawing Sheets

U.S. PATENT DOCUMENTS

| | | | |
|---|---|---|---|
| 7,539,750 B1 * | 5/2009 | Parker et al. | 709/224 |
| 2003/0118044 A1 * | 6/2003 | Blanc et al. | 370/414 |
| 2005/0047405 A1 * | 3/2005 | Denzel et al. | 370/388 |
| 2005/0066302 A1 * | 3/2005 | Kanade | 717/100 |
| 2005/0235129 A1 * | 10/2005 | Sokol | 711/170 |

* cited by examiner

PREEMPTIVE PACKET FLOW CONTROLLER

BACKGROUND INFORMATION

Software and hardware devices are routinely used as protocol controllers, to manage the flow of data packets moving between various components of one or more electronic processors. Protocol controllers normally transmit the packets arranged in fixed groups of buffers that are linked together via linked lists. The linked lists describe how the groups of buffers relate to each other. The host processor in these systems typically carries out all the computational tasks required to modify the stream of packets being sent, for example in response to an asynchronous event. This extracts a large computational penalty on the host CPU, and may slow down the performance of the system.

The protocol controllers described above are often used while testing devices, such as computer chips, software modules, and hardware systems embedded with software instructions, among others. Testing is carried out extensively during development of these devices, to ensure that the product shipped to the consumers performs as expected, and that no erroneous results are produced under a variety of different operating conditions. When the host CPU of a system is used to carry out the functions described above, the entire process slows down, particularly when the stream of packets is interrupted due to an asynchronous event. This lengthens considerably the debugging and development time of the system.

A common standard used to debug and test computational systems is the Joint Test Action Group (JTAG) standard, also known as the IEEE Standard 1149.1. This standard specifies how to control and monitor the electronic components of compliant devices on a printed integrated circuit (IC) board. The JTAG protocol contains the controls necessary to read and to set the values of the internal registers of the devices being tested in a process known as boundary scanning. The testing of IC boards is simplified by using the JTAG protocol, since signals and data which are not normally available at the connectors of the IC board can be read and set using the JTAG access port. The protocol also allows testing of equipment connected to the port, to identify the components found on the board, and to control and monitor the device's output.

SUMMARY OF THE INVENTION

In one exemplary aspect, the present invention is directed to a system to control a flow of packets to and from an electronic processor which includes a packet processor engine programmed to interpret the packets from a packet memory, and to perform switching between packet chains in response to events; a working chain pointer register of the packet processor engine, programmed to indicate progress in executing an active buffer chain; prioritized pointer storage registers of the packet processor engine, each of the registers being programmed to point to one of the active buffer chains; a control register of the packet processor engine having chain start bits and chain protect bits, the chain start bits identifying the chains that have been started; and a status register of the packet processor engine, having a chain actives group identifying the chain that is currently running, a chain matches group, a chain stops group identifying the chains that have been stopped and a timer expirations group.

In another aspect, the invention is directed to a method to control a flow of data packets on a JTAG interface. The method includes providing a packet processor engine to interpret the packets from a packet memory, and to perform switching between packet chains in response to events, initializing prioritized pointer storage registers of the packet processor engine, each of the registers pointing to a buffer chain that performs a task, updating a working chain pointer register of the packet processor engine to indicate progress in executing an active buffer chain. The method also includes setting a control register of the packet processor engine having chain start bits and chain protect bits, the chain start bits identifying the active buffer chain, and setting a status register of the packet processor engine, having bits in a chain actives group, a chain matches group, a chain stops group and a timer expirations group, the bits in the chain active group indicating the active buffer chain, and the bits in the chain stops group indicating processing of a stop packet in the active buffer chain.

Furthermore, another aspect of the present invention is a preemptive protocol controller adapted to execute instructions to control a flow of data packets using a JTAG interface, whereby the instructions, when executed, provide for the following actions: a packet processor engine programmed to interpret the packets from a packet memory, and to perform switching between chains to preempt an active chain with another chain in response to events; a working chain pointer register of the packet processor engine, programmed to indicate progress in executing the active chain; prioritized pointer storage registers of the packet processor engine, each of the registers programmed to point to one of the active chains; a control register of the packet processor engine containing data bits identifying the started chains; and a status register of the packet processor engine, containing data bits indicating the active chain.

DETAILED DESCRIPTION

Figure 1:
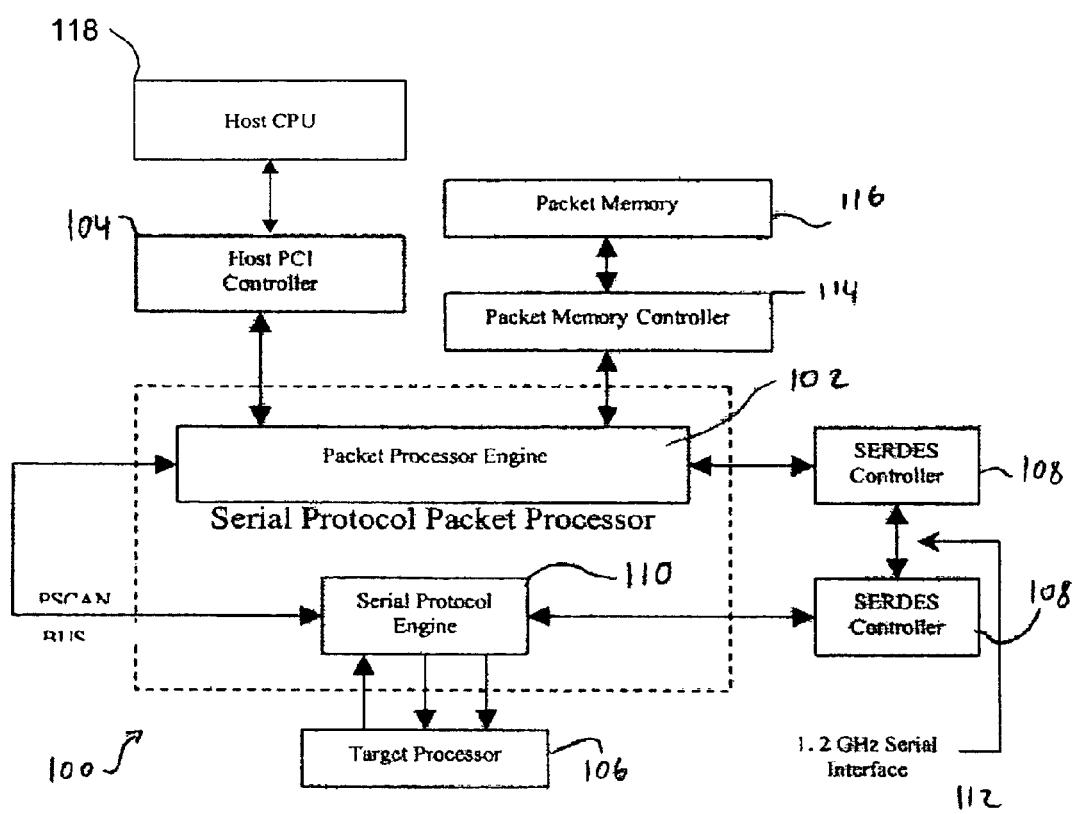
FIG. 1 is a diagram showing a representation of an exemplary preemptive packet flow controller according to the invention.

The present invention may be further understood with reference to the following description of preferred exemplary embodiments and the related appended drawings, wherein like elements are provided with the same reference numerals. The present invention is related to methods and systems used to access the internal data and programming of computational devices, such as embedded devices or other specialized computers running complex software. More specifically, the present invention is related to systems to view and modify the internal data and programming of a device through a JTAG access port, for example during testing and debugging of the device.

Protocol controllers normally transmit packets of data that are arranged within fixed groups of buffers. The buffers are linked together via linked lists, which describe the relationship between the various buffers. The data may be transmitted between components of an electronic device, or between separate devices. Conventional controllers do not have the capability to modify the stream of packets that is being sent. As a result, the CPU of the host device is left to respond to any asynchronous event, or other condition which requires a rearrangement of the streams of packets. The host CPU thus uses its computing resources to make all the decisions regarding the execution of the packets, and to control which packet stream is to be sent.

According to the exemplary embodiments of the present invention, a Preemptive Packet Flow Controller (PPFC) is provided, that has the capability to respond to asynchronous events on its own. The PPFC controller is able to switch from one packet stream or chain to another independently, without requiring the intervention of the host CPU. This implementation results in reducing the computational overhead of the host CPU, so that more resources can be directed by the host towards performing its normal functions, instead of processing the packet streams. Because the packet stream decisions are made by the controller and not the host CPU, the system minimizes the time necessary to respond to an asynchronous event. The controller thus is more responsive to events. This minimizes the amount of skid between an event that requires the device under test to do something, like be halted, and the device actually stopping. The time necessary to test the device is thus reduced, since large numbers of events requiring the test device to halt may be encountered during debugging.

The PPFC packet controller according to the present invention may be used effectively to improve the efficiency of software tools used to develop, test and debug the programming of electronic devices. The average device can contain millions of lines of code to program it to perform its functions. As applications for the devices become more complex, and the device's CPU's become faster, developers have a need to access the core processor and its peripherals. This enables the developers to determine how well the CPU and its peripherals communicate, and how well the code is being executed by the CPU. Development and testing software tools assist in these tasks. For example, the Probe and the Ice tools developed by Wind River Systems are part of a development system that gives to the developer insight into the processes taking place within a device and its CPU.

Using these and similar tools, the developer can perform debugging tasks such as monitoring and modifying memory, large numbers of register configurations, and perform multiple steps of editing, compiling, downloading and debugging complex applications of the device. For example, JTAG ports can be used to access the JTAG scan chain for the device, to debug the code on one or more CPU's, whether they are individual components or whether they are embedded on a chip within a device. The speed at which the data can be viewed and modified by the system directly affects how rapidly a given code can be debugged and made to work as desired on a device. It is thus important to optimize the exchange of data packets between the affected devices. In particular, the several embodiments of the present invention minimize the asynchronous latency of run control solutions, to reduce the cycle time necessary to debug an application.

FIG. 1 shows an exemplary embodiment of a PPFC according to the present invention. The PPFC 100 is able to respond to asynchronous events that require a reordering of the packet streams, also referred to as a chain, that are being processed, without the involvement of the host CPU. In one embodiment, the PPFC 100 can preempt a stream of packets that is being processed, by suspending the processing of the first stream and instead switching to a second different packet stream to be processed. The PPFC 100 comprises several different components. A Serial Protocol Engine 110 and a Packet Processor Engine 102 are part of the PPFC 100. Various connections are also provided, such as with the target processor 106, and to a serial interface 112, via one or more serializer/deserializer (SERDES) controllers 108. A host PCI controller 104 connected to a host CPU 118 and a packet memory controller 114, connected to a packet memory 116 are also connected operatively to the PPFC 100.

Figure 2:
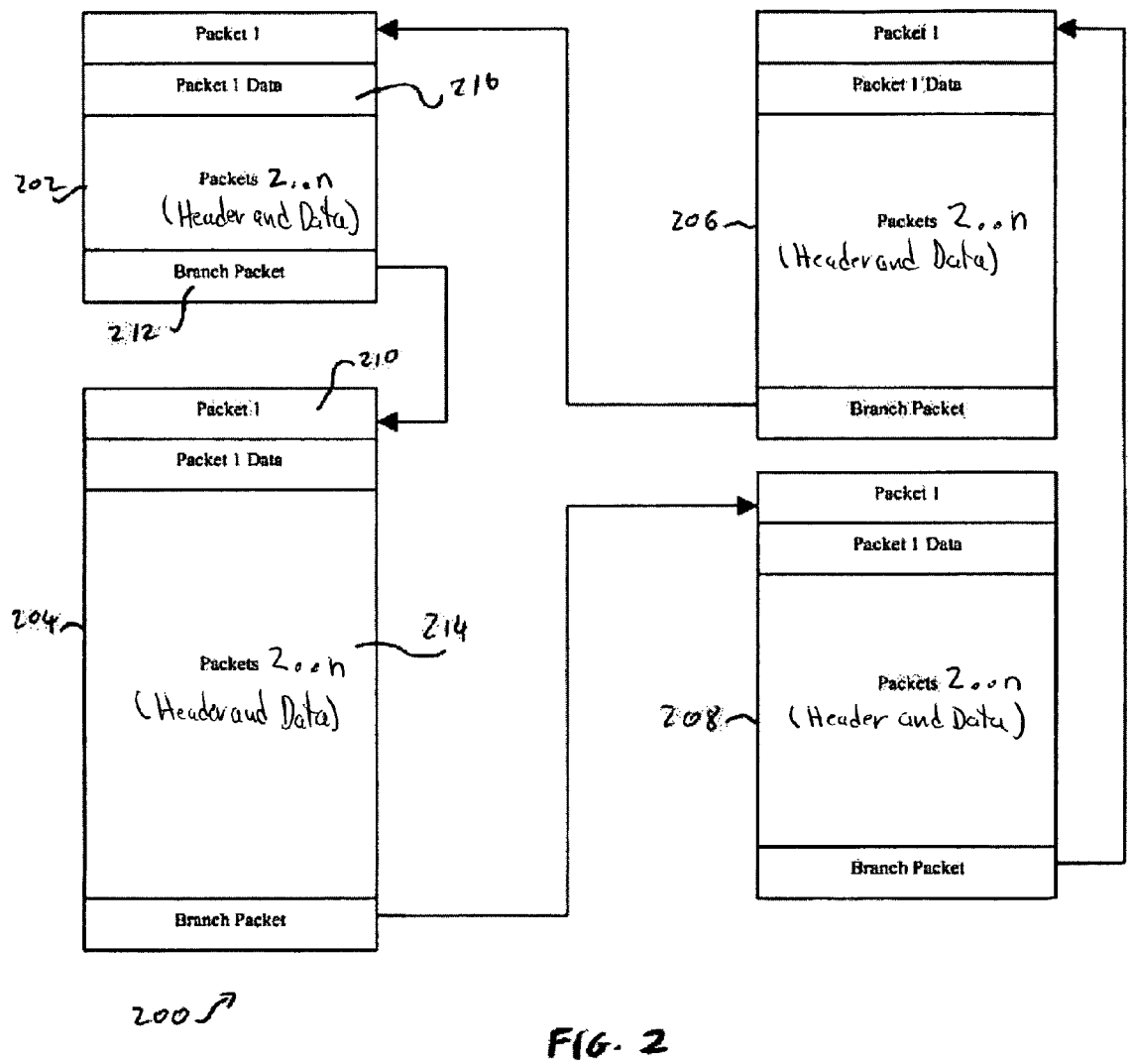
FIG. 2 is a diagram showing a typical organization of a chain of data packets.

The Packet Processor Engine (PPE) 102 is responsible for interpreting the packets from the packet memory 116, received via the packet memory controller 114. The PPE 102 controls the packet flow through the PPFC 100, and makes the switching decisions between which packet chains are processed based on pre-programmed events. The exemplary implementation of the PPFC 100 described herein has the ability to support up to four different prioritized packet chains. Each of the packet chains may contain any number of buffers containing data packets, related to one another via linked lists. FIG. 2 shows a schematic representation of an exemplary chain, containing four buffers of data packets.

According to the present embodiment of the invention, the lowest priority chain of the prioritized packet chains is used to perform the basic task allocated to the PPFC 100. On the other hand, the higher priority chains are typically used to interject tasks that may run periodically or asynchronously with respect to the basic task. Since the PPFC 100 continuously checks for asynchronous and periodic events, it provides a better way to discontinue processing one task, and instead start processing a different task.

An exemplary packet chain is shown schematically in the diagram of FIG. 2. The packet chain 200 contains four buffers, buffers 202, 204, 206 and 208 which each contain a portion of the information being processed by the PPFC 100. As described above, the buffers are related via linked lists. A branch packet 212 at the end of each buffer provides the buffer linking. The actual buffer information is contained in the body of the buffer, in a plurality of packets from 1 to n (214). This portion of the buffers 202, 204, 206, 208 may be of different size, depending on the number and size of each stored packet. The structure of each packet is comprised of two elements. A header 210 may provide information, such as packet identification, packet size, and other general information. A packet data field 216 that provides the data payload for the packet.

In the exemplary embodiment, the PPE 102 comprises four chain pointer storage registers and a working chain pointer register. This configuration, as seen by the software, is depicted schematically in FIG. 3, which shows the working chain pointer register 300, a lowest priority chain 0 pointer storage register 302, medium low priority chain 1 pointer storage register 304, medium high priority chain 2 pointer storage register 306, and highest priority chain 3 pointer storage register 308. Each of the registers 300-308 comprises a 23-bit address section and a 3-bit page select section that is used to point to a specific chain of buffers. The pointer storage registers are initialized by software to point to a specific chain of buffers that will perform a specific task.

Each packet in a buffer chain comprises a protect bit associated with it. The protect bit prevents higher priority packet chains that have been started from preempting the execution of lower priority packet chains, while the protect bit is set. By using the protect bit, the software is able to define critical regions that cannot be preempted in lower priority chains. In a typical mode of execution of the buffer chains, once the chains are started, the highest priority chain will be executed first, followed by the next highest priority chain. The PPE 102 sets the corresponding chain active bit in the status register of the highest priority chain that has started execution, and will load the working chain pointer from the started chain storage pointer register. According to the exemplary embodiment of the invention, only one chain at a time may be active and in execution. However, several or all of the chains may have been started, and may be at various points in their execution simultaneously.

As the PPE 102 processes the packets in a buffer such as buffers 202, 204, 206 and 208 within the chain 200, it continuously updates the 23-bit address portion 310 of the working chain pointer register 300. The update is performed based on the packets in the buffer. As a result, at any point in time the working chain pointer indicates the progress that the PPE 102 has made in executing the active chain of buffers. If the execution of that particular chain is interrupted or postponed, the working chain pointer information is stored in the chain storage register 302 or 304 or 306 or 308 associated with the active chain so that the execution can resume at a later time from the same point.

Figure 3:
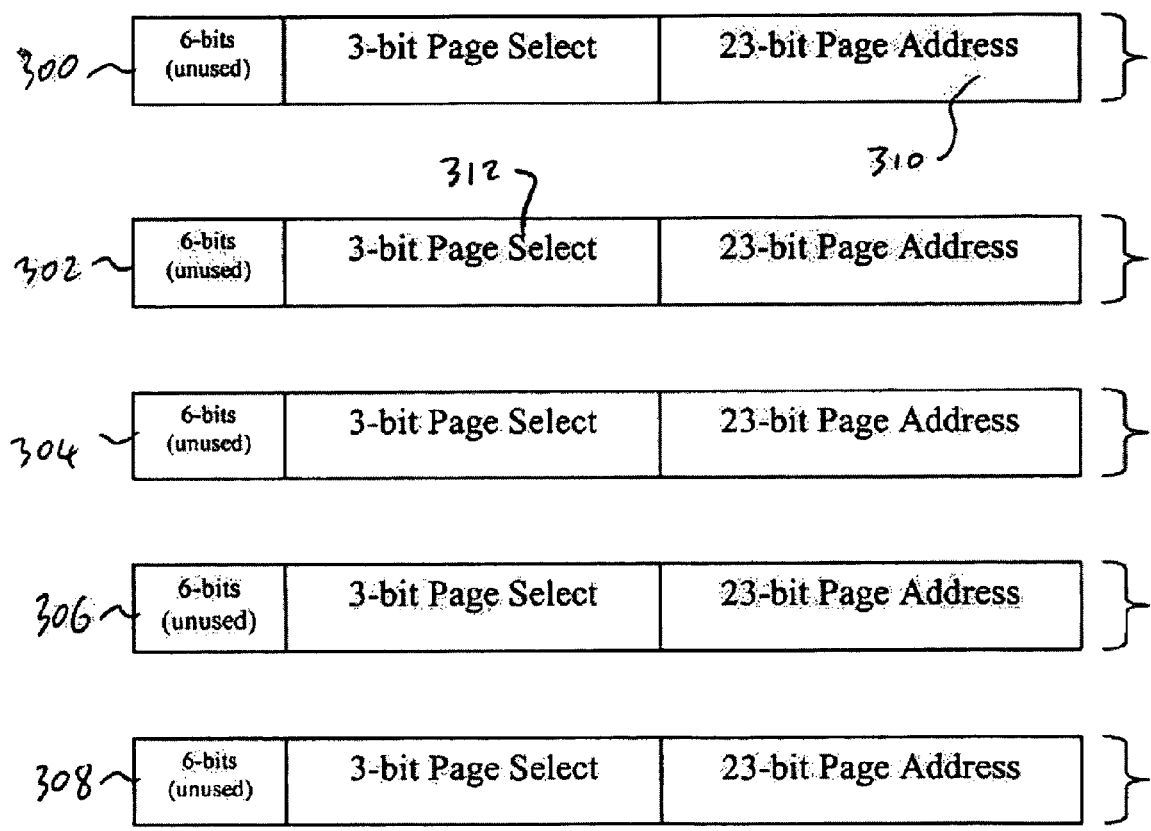
FIG. 3 is a diagram showing a representation of the working chain pointer register and of the chain pointer storage registers used in the PPE according to the invention.

When a higher priority chain of buffers requests the suspension of the execution of an active lower priority chain, it may be necessary to resume execution of the lower priority chain at a later time. When the request from the higher priority chain is received, the current value in the working chain pointer is stored in the respective storage register, so it can be retrieved when the execution of the lower priority chain resumes later. A new value for the working chain pointer is loaded from the storage pointer of the new higher priority chain, to begin its execution. According to the exemplary embodiment of the invention, only the programming software can change the 3-bit page select pointer 312 that places the chain in a specific page in physical memory. The software is designed to read and to write to the four chain-pointer storage registers 302, 304, 306 and 308. However, the software can only read the working chan pointer register 300. FIG. 3 shows a schematic representation of the registers 300-308 as seen by the software.

Figure 4:
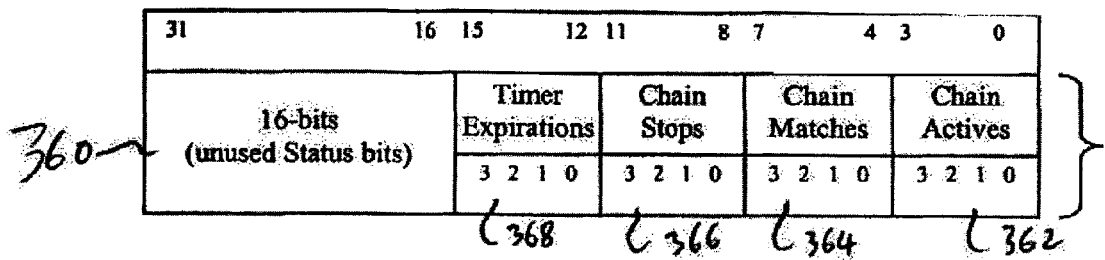
FIG. 4 is a diagram showing a representation of the control register and of the status registers used in the PPE according to the invention.
Figure 4:
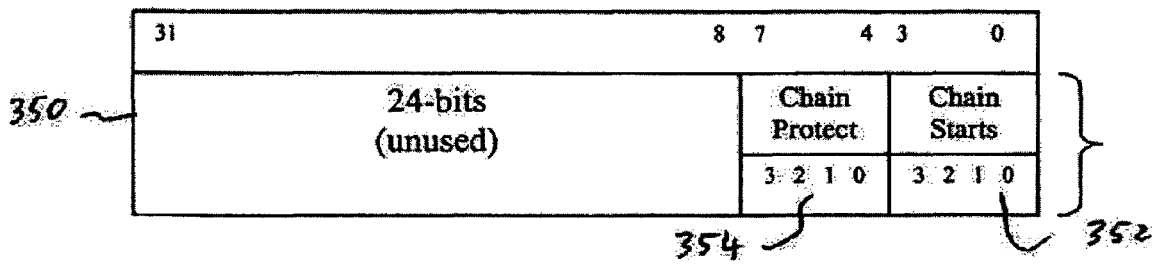

According to the exemplary embodiments of the present invention, the PPE 102 also comprises a control register, a representation of which is shown schematically, as seen by the software, in FIG. 4. The control register 350 can be both read and written to by the software. Within the control register 350, the chain start bits 352 may be either set or may be cleared by the software or by the PPE 102. The PPE 102 is programmed to accept an external event, such as an asynchronous event, and to start execution of any of the four buffer chains in response to that event. Once execution of one of the chains is started by the PPE 102, it will continue to process the packets in the chain until it reaches a STOP packet. At that point, the PPE 102 clears the corresponding START bit associated with the chain being presently executed.

Alternatively, the PPE 102 stops the execution of the chain when the software clears the START bit of the chain. The chain protect bits 354 of the control register 350 can be initialized by the software, but once a chain is active the chain protect bits 354 continuously reflect the state of the PROTECT bit of the last packet being executed. If a packet does not have a PROTECT bit associated with it, then the state of the PROTECT bits 354 in the control register 350 will not be affected.

The exemplary PPE 102 also comprises a STATUS register that has four defined groups of bits. As depicted schematically in FIG. 4, the STATUS register 360 comprises bits grouped in a chain active group 362, a chain match group 364, a chain stop bits group 366 and four timer expiration bits 368. For example, each group of bits may contain four bits, corresponding to the four chains that can be processed by the PPFC 100. The status register 360 can only be read by the software, such that the state of each group of bits is controlled by the PPE 102. According to this embodiment, the chain active group of bits 362 indicates which one of the four chains of buffers is active. This is the chain presently being executed by the PPFC 100. The bits in the chain match group 364 indicate the condition of the last compare packet in each of the chains. The bits in the chain stop group 366 indicate whether a stop packet was processed in the specific chain. The four timer expiration bits of the group 368 indicate if any of the four timers in this embodiment have expired. For example, a timer timeout can be indicated by the bits of group 368.

According to this embodiment of the invention, the chain stops bits group 366 and the timer expirations bits group 368 are cleared automatically when they are read by the software. On the other hand, the chain matches bits group 364 and the chain actives bits group 362 are not cleared, and continuously reflect the state of the PPE 102 in each chain. Accordingly, in the present embodiment which uses four chains, there are four bits for each of the groups of bits in the status register 360.

Figure 5:
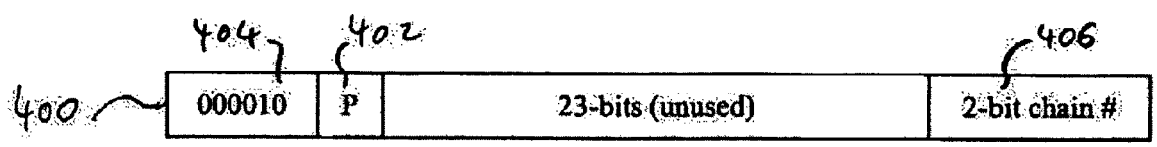
FIG. 5 is a diagram showing a representation of the start packet and of the stop packet used to control the chains of the PPFC according to the invention.
Figure 5:
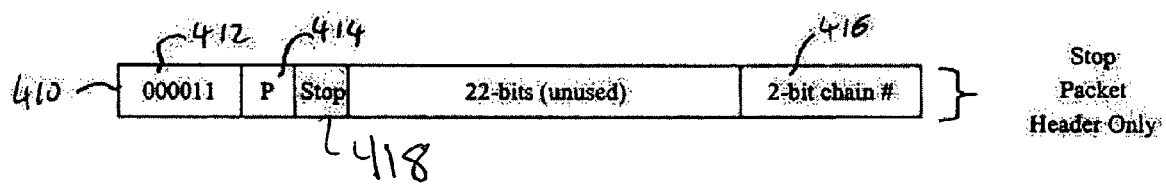

In the embodiment of the invention described herein, the PPFC 100 uses two packets to control the execution of the chains as depicted schematically in FIG. 5. A unique 6-bit packet type field identifies each of these packets. In addition, most of the other types of packets comprise a protect bit (P) which is used to update the protect bit stored in the status register 360.

One type of packet used by the PPFC 100 is the START packet 400, that comprises a string of bits "000010" in a packet type field 404. The START packet 400 does not have any data associated with it. It is an header only packet that is used to start the processing of packets by the PPE 102. When the START packet 400 is encountered, it sets the START bit of the chain starts field 352 in the control register 350 according to the chain bit specified in field 406. This causes the specified chain to run, based on the chain priority. The PPE 102 is adapted to set the corresponding protect bit of the chain protect group 354 in the control register 350 according to the value of the (P) field 402 in the START packet 400. When the PROTECT bit in chain protect group 354 is set, it prevents another chain from running until said PROTECT bit has been cleared.

A second type of packet used in the PPFC 100 is the STOP packet 410. The STOP packet 410 is identified with the string of bits "000011" in the packet type field 412, and also does not have any data associated with it. It is an header only packet used to halt the processing of packets by the PPE 102. When the STOP packet 410 is encountered, it clears the START bit of the chain starts field 352 in the control register 350 according to the chain bit specified in field 416, and sets the corresponding STOP bit in the chain stops group 366 of the STATUS register 360. When the STOP bit 418 is set, the PPE 102 will ignore the 2-bit chain number field 416 and will clear the START bit of the currently active chain in the chain start group 352 of the control register 350. The PPE 102 also sets the corresponding PROTECT bit in the chain protect group 354 of the control register 350 according to the value in the (P) field 414. If the PROTECT bit is set, it prevents another chain from running until said PROTECT bit is cleared.

Figure 6:
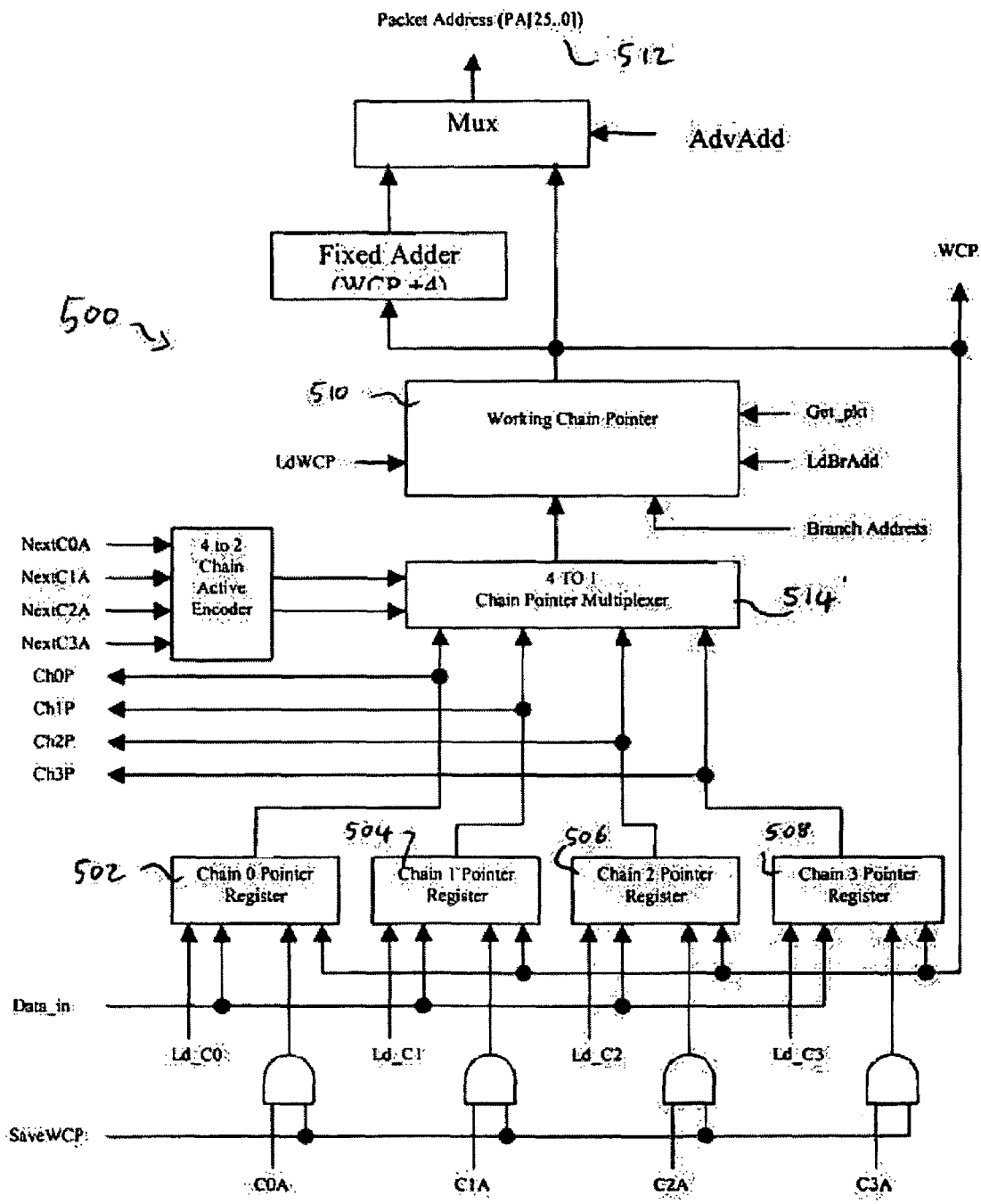
FIG. 6 is a block diagram showing the working chain pointer module according to an embodiment of the invention.

According to the embodiment of the present invention described above, an exemplary schematic representation of the working chain pointer (WCP) is depicted in the block diagram of FIG. 6. The WCP module 500 correlates the chain pointer storage registers for the four chains (0, 1, 2, and 3) with the working chain point register. These chain pointer registers were shown schematically as seen by the software and described respectively as components 302-308 and 300 in FIG. 3.

As shown in FIG. 6, signals Ld_C0, Ld_C1, Ld_C2, and Ld_C3 are activated by the software to load the data on signals Data_in into the respective chain pointer register. Similarly, the chain pointer register corresponding to the currently active chain, as specified by the chain active bits 362 of the status register, is loaded with the signals from the working chain pointer 510 when the signal SaveWCP is activated from the ChainSwitch Logic 612 of FIG. 7. Also as shown in FIG. 6, the signals from chain 0, 1, 2 and 3 pointer registers 502, 504, 506 and 508 are directed to a "4 TO 1" chain pointer multiplexer 514 which selects the signals from one of the four registers as specified by the next chain active signals NextC0A, NextC1A, NextC2A and NextC3A from the priority logic 610 of FIG. 7 and then passes them on to the working chain pointer 510. The working chain pointer 510 is loaded with the signals from the multiplexer when the signal LdWCP is activated from the chain switch logic 612 of FIG. 7. After the necessary operations are carried out by the working chain pointer 510, a signal 512 is generated by the working chain pointer module 500, that describes the packet address (i.e. PA[25..01]) of the data packet that is to be executed next by the PPFC 100. The WCP module 500 generates the address that is sent to the memory module to access the packets that are stored in the packet memory.

Figure 7:
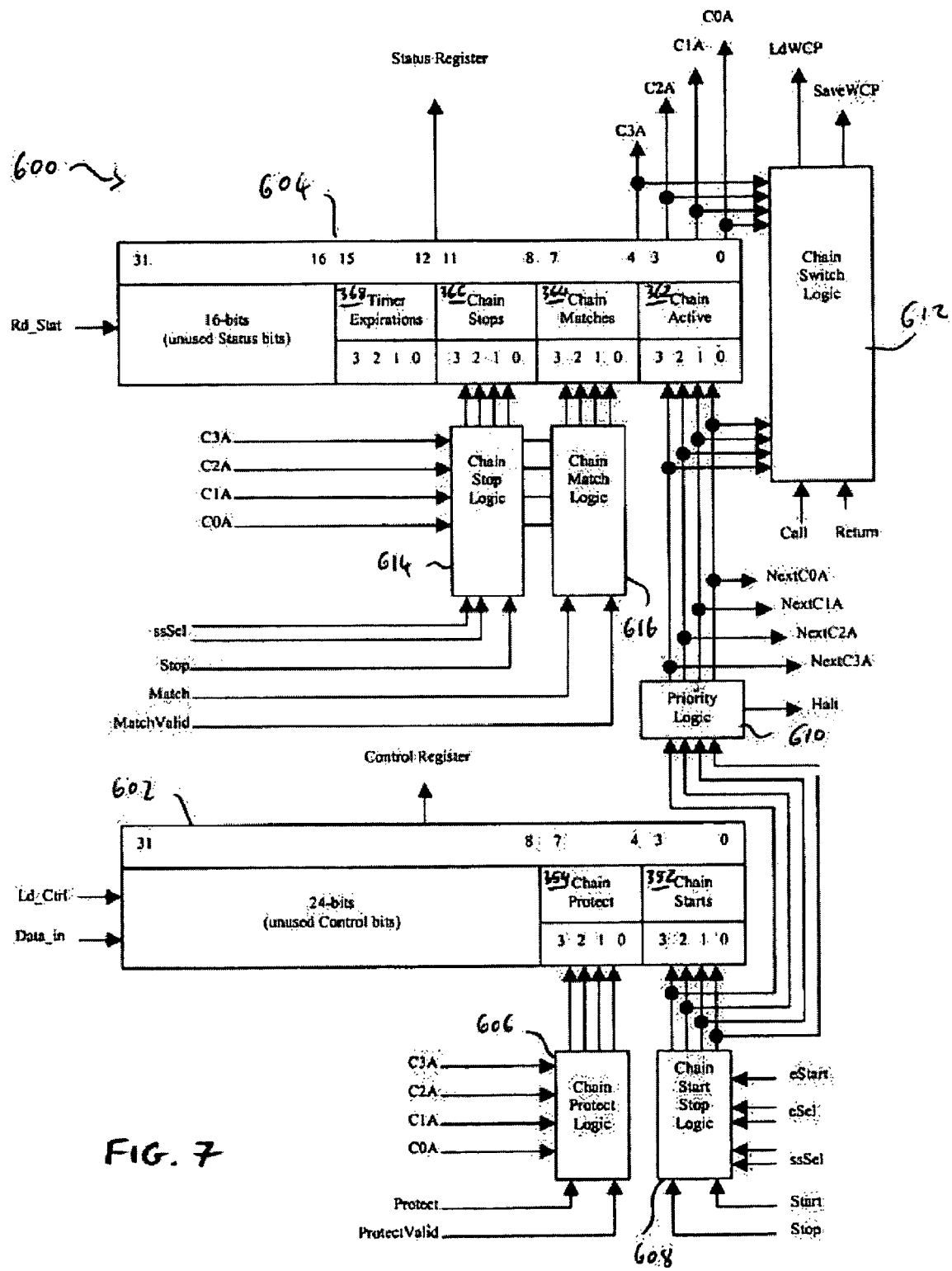
FIG. 7 is a block diagram showing the control register and the status register module according to an embodiment of the invention.

The relationship as seen by the software between the exemplary control register 350 and status register 360 described in FIG. 4 is shown as a block diagram in FIG. 7. The control and status register module 600 comprises control register 602 and the status register 604. The status register 604 provides four groups (362-368) of four bits each of status, that can be read by the software. These groups include the timer expiration group 368 and the chain stops groups 366 that are automatically cleared by signal RdStat each time the software reads the status register 604. The chain match group 364 and the chain active groups 362, on the other hand, are not cleared when the status register 604 is read.

The control register 602 provides two groups of four bits each (352, 354) that can be read and written when signal LdCtrl is activated by the software. The control bits may also be manipulated by the PPE 102. In the exemplary embodiment, the status register 604 and the control register 602 are related by a priority logic element 610 which feeds a prioritized signal to the active chain group 362, i.e., only the highest priority signal received at the input to the Priority Logic 610 is indicated on one of the outputs NextC0A, NextC1A, NextC2A and NextC3A of the Priority Logic 610. A chain protect logic element 606 and a chain start/stop logic element 608 provide inputs to the chain protect group 354 and to the chain starts group 352 of the control register 602, respectively.

The Protect Valid signal to the Chain Protect Logic 606 is activated when a packet header is decoded containing a Protect Bit field, i.e. 402, 414, etc. The signal Protect that represents the value of the Protect Bit field is then presented to the bit of the Chain Protect group 354 as specified by the chain active signals C3A, C2A, C1A and C0A from the Status Register group 362. For example, if C2A is active then the value of Protect is copied into bit-2 of the Chain Protect group 354. The Start signal to the Chain Start Stop Logic 608 is activated when a Start packet 400 is executed. The signals ssSel represent the value of the chain # field 406 that specifies which bit of the Chain Starts group 352 is set. Similarly, the Stop signal to the Chain Start Stop Logic 608 is activated when a Stop packet 410 is executed. The signals ssSel represent the value of the chain # field 416 that specifies which bit of the Chain Starts group 352 is set. Additionally, the Chain Starts bits 352 can be set by a programmed event such as a timer expiring. The eStart signal to the Chain Start Stop Logic 608 is activated when the programmed event occurs and causes the Chain Start bit to be set as specified by the programmed eSel signals.

Connected to the status register 604 are a chain stop logic element 614, providing input to the chain stops group 366, and a chain match logic element 616, providing inputs to the chain matches group 364. The Stop signal to the Chain Stop Logic 614 is activated when a Stop packet 410 is executed. The signals ssSel represent the value of the chain # field 416 that specifies which bit of the Chain Stops group 366 is set.

As shown in the block diagram of FIG. 7, a chain switch logic element 612 utilizes inputs from the status register 604 and from the priority logic element 610 to generate additional outputs of the control and status register module 600. In particular, the Chain Switch Logic 612 will activate the SaveWCP signal whenever a chain switch is required in order to save the current WCP in the appropriate chain storage register and simultaneously activate the LdWCP signal to load the WCP with the value from the storage register associated with the next highest priority chain to run. The Chain Priority Logic makes it decisions based on the priority of the currently active chain 362 from the status register 604 and the next highest priority chain from the priority logic 610.

Although the present invention was described with reference to specific exemplary embodiments using a testing system based on the JTAG protocol, the system described above can be applied with minimal changes to other platforms of similar architecture. Accordingly, the above described exemplary embodiments are to be treated as descriptive rather than limiting.

What is claimed is:

1. A system for controlling a packet flow using a JTAG interface comprising:
   a packet processor engine programmed to interpret the packets from a packet memory, to determine a packet chain switching decision at a controller level, wherein the switching involves changing from a first continuous stream of packets to a second continuous stream of packets, and to perform switching between packet chains in response to events, the packet processor engine sending a selected packet chain to a remote host processor separate from the system, wherein determining the packet chain switching decision by the packet processor engine is performed in response to an asynchronous event and is performed independently of the remote host processor;
   a working chain pointer register of the packet processor engine, programmed to indicate progress in executing an active buffer chain;
   prioritized pointer storage registers of the packet processor engine, each of the registers being programmed to point to one of the active buffer chains;
   a control register of the packet processor engine having chain start bits and chain protect bits, the chain start bits identifying the active buffer chains that have been started; and
   a status register of the packet processor engine, having a chain active group identifying the chain that is currently running, a chain matches group, a chain stops group identifying the chains that have been stopped and a timer expirations group.

2. The system according to claim 1, wherein the packet processor engine is adapted to operate on four separate buffer chains.

3. The system according to claim 1, wherein the control register comprises the chain protect bits and the chain start bits each having four bits.

4. The system according to claim 1, wherein the status register comprises the chain actives, chain matches, chain stops and timer expirations groups each having four bits.

5. The system according to claim 1, wherein the buffer chain comprises a plurality of buffers containing packets of data, related by a linked list.

6. The system according to claim 1, further comprising a priority logic element operating on the chain active group of the status register and signals from a chain start stop logic to determine the active buffer chain.

7. The system according to claim 1, further comprising a chain switch logic element adapted to store from the working chain pointer register a working chain pointer of a lower priority chain being preempted, and to load into the working chain pointer register a working chain pointer of a preempting higher priority chain.

8. The system according to claim 1, further comprising a working chain pointer module programmed to generate a packet address to be accessed from a packet memory, based on data from the working chain pointer register and from the prioritized pointer storage registers.

9. The system according to claim 1, further comprising a start packet and a stop packet used to control execution of each of the buffer chains.

10. The system according to claim 9, wherein the start packet is a header only packet adapted to cause the packet processor engine to set a start bit for the active buffer chain in the control register, thus causing the active chain to run based on chain priority.

11. The system according to claim 9, wherein the stop packet is a header only packet adapted to cause the packet processor engine to clear the start bit for the active buffer chain in the control register, and to set a corresponding stop bit in the status register.

12. A method to control a flow of data packets on a protocol controller of a JTAG interface, comprising:
providing a packet processor engine to interpret the packets from a packet memory, to determine a packet chain switching decision at a controller level, wherein the switching involves changing from a first continuous stream of packets to a second continuous stream of packets, and to perform switching between packet chains in response to events, the packet processor engine sending a selected packet chain to a remote host processor separate from the protocol controller, wherein determining the packet chain switching decision by the packet processor engine is performed in response to an asynchronous event and is performed independently of the remote host processor;
initializing prioritized pointer storage registers of the packet processor engine, each of the registers pointing to a buffer chain;
updating a working chain pointer register of the packet processor engine to indicate progress in executing an active buffer chain;
setting a control register of the packet processor engine having chain start bits and chain protect bits, the chain start bits identifying the active buffer chain; and
setting a status register of the packet processor engine, having a chain active group, a chain matches group, a chain stops group and a timer expirations group, the bits in the chain active group indicating the active buffer chain, and the bits in the chain stops group indicating processing of a stop packet in the active buffer chain.

13. The method according to claim 12, further comprising forming the buffer chains with a plurality of buffers containing packets of data, related by a linked list.

14. The method according to claim 12, further comprising determining the active buffer chain in a priority logic element operating on the chain active group of the status register.

15. The method according to claim 12, further comprising storing from the working chain pointer register the working chain pointer of a lower priority chain being preempted, and loading into the working chain pointer register a working chain pointer of a preempting higher priority chain.

16. The method according to claim 12, further comprising generating a packet address to be accessed from a packet memory, based on data from the working chain pointer register and from the prioritized pointer storage registers.

17. The method according to claim 12, further comprising using a start packet to cause the packet processor engine to set a start bit in the control register, thus causing the active buffer chain to run based on chain priority.

18. The method according to claim 12, further comprising using a stop packet to cause the packet processor engine to clear the start bit for the active buffer chain in the control register, and to set a corresponding stop bit in the status register.

19. The method according to claim 12, further comprising providing the packet processing engine adapted to perform switching between four buffer chains having different chain priorities.

20. A preemptive protocol controller adapted to execute instructions to control a flow of data packets using a JTAG interface, whereby the instructions, when executed, provide for:
a packet processor engine programmed to interpret the packets from a packet memory, to determine a packet chain switching decision at a controller level, wherein the switching involves changing from a first continuous stream of packets to a second continuous stream of packets, and to perform switching between chains to preempt an active chain with another chain in response to events, the packet processor engine sending a selected packet chain to a remote host processor separate from the preemptive protocol controller, wherein determining the packet chain switching decision by the packet processor engine is performed in response to an asynchronous event and is performed independently of the remote host processor;
a working chain pointer register of the packet processor engine, programmed to indicate progress in executing the active chain;
prioritized pointer storage registers of the packet processor engine, each of the registers programmed to point to one of the active chains;
a control register of the packet processor engine containing data bits identifying the started chains; and
a status register of the packet processor engine, containing data bits indicating the active chain.

21. The preemptive protocol controller according to claim 20, wherein the packet processor engine is programmed to perform switching between four prioritized chains.

22. The preemptive protocol controller according to claim 21, wherein the control register and the status register comprise data groups of four bits corresponding to the four prioritized chains.

23. The preemptive protocol controller according to claim 20, further comprising a chain switch logic element programmed to store from the working chain pointer register a working chain pointer of a lower priority chain being preempted, and to load into the working chain pointer register a working chain pointer of a preempting higher priority chain.

24. The preemptive protocol controller according to claim 20, further comprising a working chain pointer module programmed to generate a packet address to be accessed from a packet memory, based on data from the working chain pointer register and from the prioritized pointer storage registers.

25. The preemptive protocol controller according to claim 20, wherein the executed instructions provide for utilizing a start packet and a stop packet to control execution of each of the chains, the start packet causing the packet processor engine to set a start bit for the active buffer chain in the control register, and the stop packet causing the packet processor engine to clear the start bit for the active buffer chain in the control register, and to set a corresponding stop bit in the status register.

* * * * *